United States Patent
Aouini et al.

(10) Patent No.: US 10,805,064 B1
(45) Date of Patent: Oct. 13, 2020

(54) BUILT-IN JITTER LOADING AND STATE OF POLARIZATION GENERATION TO CHARACTERIZE OPTICAL TRANSCEIVERS

(71) Applicant: Ciena Corporation, Hanover, MD (US)

(72) Inventors: Sadok Aouini, Gatineau (CA); Naim Ben-Hamida, Nepean (CA); Ahmad Abdo, Kanata (CA); Timothy James Creasy, Manotick (CA); Lukas Jakober, Ottawa (CA); Yalmez M. A. Yazaw, Nepean (CA); Shahab Oveis Gharan, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/391,527

(22) Filed: Apr. 23, 2019

(51) Int. Cl.
| | |
|---|---|
| *H04B 10/50* | (2013.01) |
| *H04B 10/69* | (2013.01) |
| *H04L 7/033* | (2006.01) |
| *H04B 10/071* | (2013.01) |
| *H04B 10/40* | (2013.01) |
| *H04B 10/25* | (2013.01) |
| *H04B 10/079* | (2013.01) |

(52) U.S. Cl.
CPC ......... *H04L 7/0331* (2013.01); *H04B 10/071* (2013.01); *H04B 10/0795* (2013.01); *H04B 10/25* (2013.01); *H04B 10/40* (2013.01)

(58) Field of Classification Search
CPC ............... H04L 43/087; H03M 1/0656; H04J 2203/0076; H04B 10/50–588; H04B 10/66; H04B 10/6973
See application file for complete search history.

(56) References Cited

U.S. PATENT DOCUMENTS

| 5,793,822 A * | 8/1998 | Anderson .............. H04B 17/20 375/371 |
| 10,084,591 B1 * | 9/2018 | Palusa ..................... H04L 1/205 |

(Continued)

OTHER PUBLICATIONS

Yan et al.; Programmable Group-Delay Module Using Binary Polarization Switching, Jul. 2003 [online], [retrieved on Jan. 22, 2020]. Retrieved from the Internet <URL: https://www.generalphotonics.com/downloads/techpubs/Programmable-Group-Delay-Module-Using-Binary-Polarization-Switching.pdf> (Year: 2003).*

(Continued)

*Primary Examiner* — Nathan M Cors
(74) *Attorney, Agent, or Firm* — Clements Bernard Walker; Lawrence A. Baratta, Jr.; Christopher L. Bernard (57) ABSTRACT

A system includes an optical transmitter including a transmitter Phase Lock Loop (PLL) circuit; an optical receiver connected to the optical transmitter and including a receiver PLL circuit; and circuitry configured to inject a test stimulus to a clock causing jitter in one of the transmitter PLL circuitry and the receiver PLL circuit, wherein the test stimulus is set for characterizing the jitter tolerance of optical receiver. As well, a circuit that injects SOP transient at the transmitter is included. It is configured to test the tolerance of optical receiver to handle fast change in the SOP state. The optical receiver is configured to determine if the system is operational at a jitter value due to the test stimulus based on compliance to one or more thresholds including any of a target Bit Error Rate, a Forward-Error-Correction (FEC) hit, and a jitter Root Mean Square (RMS).

18 Claims, 7 Drawing Sheets

(56) References Cited

U.S. PATENT DOCUMENTS

| | | | |
|---|---|---|---|
| 10,243,671 B1 | 3/2019 | Aouini et al. | |
| 2005/0111536 A1* | 5/2005 | Cranford, Jr. | H04B 3/462 375/226 |
| 2005/0271131 A1* | 12/2005 | Hafed | G01R 31/31709 375/224 |
| 2009/0304391 A1* | 12/2009 | Harley | H04B 10/25137 398/147 |
| 2014/0098843 A1* | 4/2014 | Kong | G01R 31/31709 375/219 |
| 2014/0341595 A1 | 11/2014 | Harley et al. | |
| 2017/0310390 A1 | 10/2017 | Shiner et al. | |
| 2019/0044627 A1* | 2/2019 | Cohen | H04B 17/29 |
| 2019/0319715 A1* | 10/2019 | Kowalevicz | H04B 10/67 |
| 2019/0386773 A1* | 12/2019 | Nir | H04L 1/0045 |

OTHER PUBLICATIONS

N. Garrafa et al., Multi-Vendor 100G DP-QPSK Line-Side Interoperability, Field Trial over 1030 km, 2017, pp. 1-3.

M. Eiselt et al., Contribution of Timing Jitter and Amolitude Distortion to XPM System Penalty in WDM Systems, IEE Photonics Technology Letters, vol. 11, No. 6, Jun. 1999, pp. 1-3.

F. Gardner, A BPSK/QPSK Timing-Error Detector for Sampled Receivers, IEEE Transactions of Communications, vol. COM-34, No. 5, May 1986, pp. 1-7.

V. S. Grigoryan et al., Calculation of Timing and Amplitude Jitter in Dispersion-Managed Optical Fiber Communications Using Linearization, Journal of Lightwave Technology, vol. 17, No. 8, Aug. 1999, pp. 1347-1356.

Oif, Letter to David Law and members of the IEEE 802.3 Working Group, Start of 400ZR Interop Project, Nov. 7, 2016, p. 1.

International Telecommunication Union, ITU-T O.172, Telecommunication Standardization Sector of ITU, Jitter and wander measuring equipment for digital systems which are based on the synchronous digital hierarchy (SDH), Mar. 1999, pp. 1-39.

M. Enright et al., Open Cables and Integration With Terrestrial Networks, SubOptic, Emerging Subsea Networks, 2016, pp. 1-6.

* cited by examiner

BUILT-IN JITTER LOADING AND STATE OF POLARIZATION GENERATION TO CHARACTERIZE OPTICAL TRANSCEIVERS

FIELD OF THE DISCLOSURE

The present disclosure generally relates to fiber optics. More particularly, the present disclosure relates to systems and methods for built-in jitter loading and state of polarization generation to characterize optical transceivers.

BACKGROUND OF THE DISCLOSURE

The move from vendor-locked line systems and mature proprietary coherent Digital Signal Processing (DSP) technologies optical networks to both interoperable transponders (e.g., OIF 400GZR), line networks (e.g., openROADM) and open cables proposed for submarine applications, is the trend for future networks deployments. An important aspect of high-speed systems design is the area of synchronization, and specifically the control of jitter to ensure end-to-end reliability. Especially in optical networks that span large distances, such as those implemented for continent-wide or transoceanic submarine applications. Due to the non-idealities of circuits and systems, a synthesized clock has deviation. The latter is manifested as phase and frequency drifting and variations. At the physical layer, to determine if a transmitted bit is 1 or 0, the recovered clock signal from data should occur at a time where eye opening is maximum. Therefore, if the jitter in a system is not tracked, it can cause bit errors that degrade the performance of the transmission system.

Stringent specifications on jitter are unavoidable, and ways to reduce the sources of jitter is a key part of high-speed telecommunication systems. As well, it is becoming vital for network operators to have physical level tests to characterize both modems and channels. Such tests need to report information such as noise tolerance and jitter tolerance.

In Kim, et al., "An on-chip jitter tolerance test circuit for mobile and video interfaces," 2016 *IEEE International Conference on Consumer Electronics-Asia (ICCE-Asia)*, Seoul, 2016, pp. 1-4, jitter injection at the output of charge pump of the Phase Locked Loop (PLL) is described, where the amplitude of voltage driving the Voltage-Controlled Oscillator (VCO) is being modulated. The drawbacks of this approach are its analog nature. As well, how the charge pump is loaded which can only be high-pass since it is complementary to the main PLL loop; since the latter has a pole at DC.

As stated in Yi Cai, et al., "Jitter testing for gigabit serial communication transceivers," in *IEEE Design & Test of Computers*, vol. 19, no. 1, pp. 66-74, January/February 2002, the majority of high-speed digital wireline transceivers have their Digital-to-Analog Converters (DAC) timing is controlled by a PLL. While at the receiver (Rx) side, PLL and Delay-Locked Loop (DLL) are used to extract the clock information from the data and correction is applied properly to Analog-to-Digital Converters (ADC) or to digital interpolator within DSP.

The conventional approach to test jitter and/or SOP includes external test equipment, e.g., a jitter and BERT (Bit Error Rate Test) module. Such modules are costly, bulky, and external devices. Further, these test modules require calibration, connection, and physical space.

BRIEF SUMMARY OF THE DISCLOSURE

In an embodiment, a system includes an optical transmitter including a transmitter Phase Lock Loop (PLL) circuit; an optical receiver connected to the optical transmitter and including a receiver PLL circuit; and circuitry configured to inject a test stimulus to a clock purposefully causing jitter in one of the transmitter PLL circuitry and the receiver PLL circuit, wherein the test stimulus is set for characterizing the jitter support of the system. The optical receiver can be configured to determine if the system is operational at a jitter value due to the test stimulus based on compliance to one or more thresholds including any of a target Bit Error Rate, a Forward-Error-Correction (FEC) hit, and a jitter Root Mean Square (RMS). The test stimulus can be set to produce a jitter mask based on a fixed jitter value, and wherein the optical receiver can be configured to determine compliance to one or more thresholds to determine if the system is operational at the fixed jitter value. The test stimulus can be set to produce different jitter values in amplitude and frequency, and wherein the optical receiver is configured to determine if the system is operational at the different jitter values based on compliance to one or more thresholds to determine. The system can further include a fiber link between the optical transmitter and the optical receiver, wherein the test stimulus is utilized to characterize the jitter support of the fiber link. The configured to inject the test stimulus can be integrated in the optical transmitter, and wherein the optical receiver can be configured to recovery a clock and measure an impact of the caused jitter.

The circuitry configured to inject the test stimulus can be integrated in the optical receiver, and wherein the optical receiver can be configured to recovery a clock plus the test stimulus and measure an impact of the caused jitter. The circuitry configured to inject the test stimulus can be programmed utilizing a Look Up Table (LUT). The circuitry configured to inject the test stimulus can be integrated in the transmitter PLL as a phase interpolator in a feedback loop. The system can further include firmware configured to perform a State of Polarization (SOP) injection at the optical transmitter, to characterize optical receiver tolerance to SOP transient operation. The system can further include firmware configured to perform both State of Polarization (SOP) and Differential Group Delay (DGD) injection at the optical transmitter, to characterize optical receiver tolerance to SOP transient operation, in presence of DGD. The test stimulus can be a deterministic periodic signal including any of i) a multi-tone signal having any spectral shape and distribution and ii) a deterministic band-limited noise signal.

In another embodiment, an optical receiver includes an Electro-Optic (EO) device configured to interface a fiber link; an Analog-Digital Converter (ADC) connected to the EO device; a receiver Digital Signal Processor (DSP) connected to the ADC; and a receiver Phase Lock Loop (PLL) circuit connected to the ADC and the receiver DSP; wherein the receiver DSP and the receiver PLL are configured to recover a clock from an optical signal received over the fiber link and to measure an impact of jitter purposefully injected in the clock. The jitter purposefully injected can be at a specified jitter value, and wherein the receiver DSP is configured to determine compliance to one or more thresholds including any of a target Bit Error Rate, a Forward-Error-Correction (FEC) hit, and a jitter Root Mean Square (RMS). The jitter purposefully injected can be set to produce a jitter mask based on a fixed jitter value, and wherein the optical receiver is configured to determine compliance to one or more thresholds to determine if the optical receiver is operational at the fixed jitter value. The jitter purposefully injected can be set to produce different jitter values in amplitude and frequency, and wherein the optical receiver is configured to determine if the optical receiver is operational at the different jitter values based on compliance to one or more thresholds.

In a further embodiment, an optical transmitter includes a transmitter Phase Lock Loop (PLL) circuit configured to receive a signal with an associated clock; a Digital-to-Analog Converter (DAC) connected to the transmitter PLL; and an Electro-Optic (EO) device connected to the DAC and configured to transmit over a fiber link, wherein the transmitter PLL circuit is configured to inject a test stimulus to the associated clock purposefully causing jitter for characterizing jitter support. The purposefully caused jitter can be at a specified jitter value, and wherein a corresponding optical receiver is configured to determine compliance to one or more thresholds including any of a target Bit Error Rate, a Forward-Error-Correction (FEC) hit, and a jitter Root Mean Square (RMS). The transmitter PLL circuit can include a phase interpolator in a feedback loop. The optical transmitter can further include firmware configured to perform a State of Polarization (SOP) injection to the signal, to characterize SOP transient operation.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for built-in jitter loading and state of polarization generation to characterize optical transceivers and fiber channels. Specifically, the present disclosure includes built-in test circuitry as well as the use of existing functions in optical modems for characterizing jitter and/or State of Polarization (SOP). For example, an existing function can include a phase error detector in a modem transceiver DSP Application Specific Integrated Circuit (ASIC). Advantageously, the present disclosure provides a low cost, integrated implementation. For jitter characterization, the present disclosure provides high-resolution, operates in the phase domain (Amplitude Modulation (AM) to Phase Modulation (PM) is not required), and can be controlled and calibrated with the existing on-chip processor and a digital interface is available. The integrated testing can be used for lab, manufacturing, and/or field testing of jitter and polarization.

Jitter and its Characterization

Both Tx and RX have embedded PLLs to generate clocks and facilitate plesiochronous clocking. Historically, the standards covered the client interfaces such as Ethernet. However, with emerging standards, such as 400G-ZR OIF, for interoperability between different coherent transceiver vendors over line side Dense Wavelength Division Multiplexing (DWDM) networks, testing criteria must be established early to increase chances of success at mass deployment. The work in progress standards are targetting low-power modems in small factor modules. Power envelopes such as Octal Small Form Factor Pluggable (OSFP) and Quad Small Form Factor Pluggable Double Density (QSFP-DD) are specified with stringent 15 W and 20 W as total consumption. Since external test equipment is expensive, bulky and hard to set up in the field, especially when plugged to data-center switches. As well, the targeted form factors have a minimal number of pins reserved for debugging, having a built-in solution is highly preferable.

Accordingly, the present disclosure has the following characteristics.

A memory-based testing solution that is programmable digitally, allowing for sinusoidal waveforms to be summed since jitter and the ability to generate jitter tolerance mask in one shot, i.e., fast capture of the mask.

High-resolution with high data-rate and allowance for re-usage in future standards.

Small foot-print, low-power, and built-in (integrated).

In a transmission system, there are three jitter transfer behaviors that can be used to describe the effect on the quality of the sampling clock.

First, jitter generation is the amount of jitter added to the signal sampled with a clean clock. The source of jitter could be random or deterministic.

Jitter transfer is the ratio of the output jitter over the input jitter, expressed in terms of dBc, gain using the carrier as the reference.

Jitter tolerance is a specification to indicate how much jitter the system can tolerate at the input while maintaining the desired performance at the specific Bit Error Rate (BER).

A jitter tolerance test, of the Clock Data Recovery (CDR), is important at the system level since it is linked to the BER. It includes modulating the edge of a reference clock with, for example, a sinusoidal function (since it is well-defined by amplitude and frequency) and measuring the ability of the receiver to track. Phase noise is classically characterized in the frequency domain. Converting from phase noise profile (noted as L(f)), to rms (root-mean-square) jitter is done by integrating over the whole band of frequencies (defined per standard), as follow:

$$RMS_{jitter} = \frac{1}{2*\pi*F_c}\sqrt{2*\int_{f_1}^{f_2} 10^{\frac{L(f)}{10}} df} \quad (1)$$

Therefore, the jitter tolerance mask is meant to test the CDR's tracking ability (as described in Telcordia's GR-253-CORE, September 2000, the contents of which are incorporated by reference herein, section 5.6.2.2.2). In standards, such as in GR-253-CORE, the frequency intervals for different network protocols are defined as:

SONET OC-192: 50 kHz ($f_1$) to 80 MHz ($f_2$)
Fiber Channel: 637 kHz ($f_1$) to 10 MHz ($f_2$).

Sources of Litter in Optical Layer 0 Networks

Coherent receivers must deal with two main sources of jitter, one is specific to optical connections and the second is due to typical PLL design. Jitter from optical links can be due to:

Chromatic dispersion (CD), which its bulk part should be compensated before being able to digitally recover timing information, although a certain residual dispersion tolerance is anticipated, but it comes with a penalty. In S. Oda et al., "Interplay between local oscillator phase noise and electrical chromatic dispersion compensation in digital coherent transmission system," 36th European Conference and Exhibition on Optical Communication, Torino, 2010, pp. 1-3, when CD is convoluted with the phase noise of the local oscillator it causes timing jitter. Amplified Spontaneous Emission (ASE) induced by optical line amplifiers can shift the pulse from its ideal location (see V. S. Grigoryan, et al., "Calculation of Timing and Amplitude Jitter in Dispersion-Managed Optical Fiber Communications Using Linearization," J. Lightwave Technol. 17, 1347-(1999)). Kerr nonlinearity such as Self-Phase Modulation (SPM) and Cross-Phase Modulation (XPM) have an effect on timing jitter as shown, respectively, in M. Eiselt, et al., "Contribution of timing jitter and amplitude distortion to XPM system penalty in WDM systems," in IEEE Photonics Technology Letters, vol. 11, no. 6, pp. 748-750, June 1999, and M. Eiselt, "The impact of non-linear fiber effects on fiber choice for ultimate transmission capacity," Optical Fiber Communication Conference 2000, vol. 1, pp. 58-60 vol. 1, 2000. In the case of 400GZR applications, short-reach up to 100 km, fiber non-linearities are not a substantial source of jitter.

From the electronics side or Radio Frequency (RF) on both the Tx and Rx clocks, PLLs generate the different clocks needed for the transmission and the reception. However, elements within the PLLs are one of the main contributors for clock Periodic/Random (see G. Hansel, et al., "Implementation of an economic jitter compliance test for a multi-gigabit device on ATE," Test Conference, 2004. Proceedings. ITC 2004. International, 2004). They are part of the jitter generation of the circuit. The dominant sources of jitter in PLLs are the Voltage Controlled Oscillator (VCO) and Charge Pump (CP). With respect to the VCO, it is subject to jitter accumulation which manifests itself as high phase noise at low-frequency offsets with respect to the carrier frequency. Other sources, such as thermal noise, and flicker noise in clock buffers, internal aperture of the ADC, supply variation and electromagnetic coupling, are listed in Feng Tan, et al., "Analysis of Phase Noise and Timing Jitter in Crystal Oscillator," International Conference Communications, Circuits and Systems, pp. 1103-1106, 11-13 Jul. 2007.

Built-in Circuit and Operation Process

Figure 1:
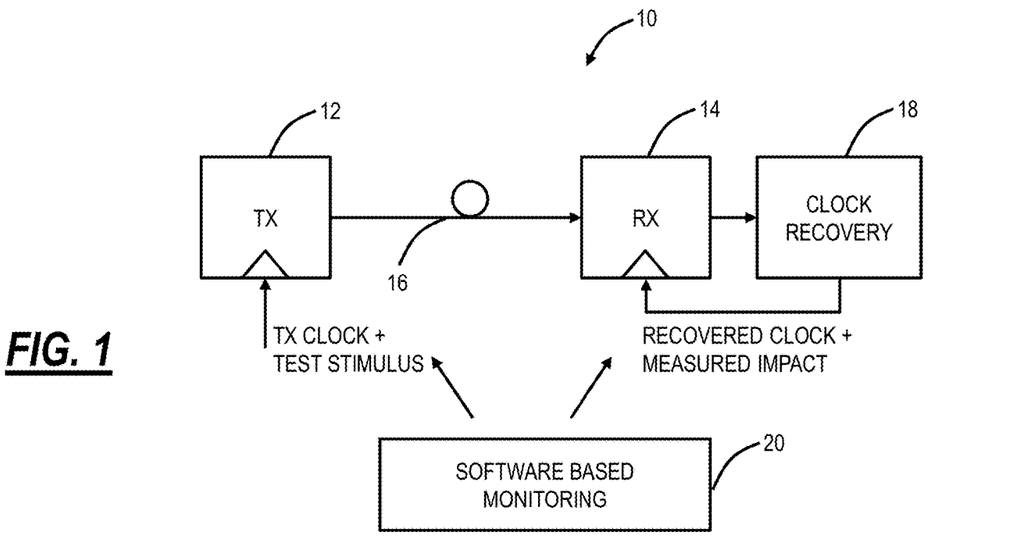
FIG. 1 is a block diagram of a system for characterizing jitter by modulating a transmitter clock with a test stimulus and determining the measured impact.
Figure 2:
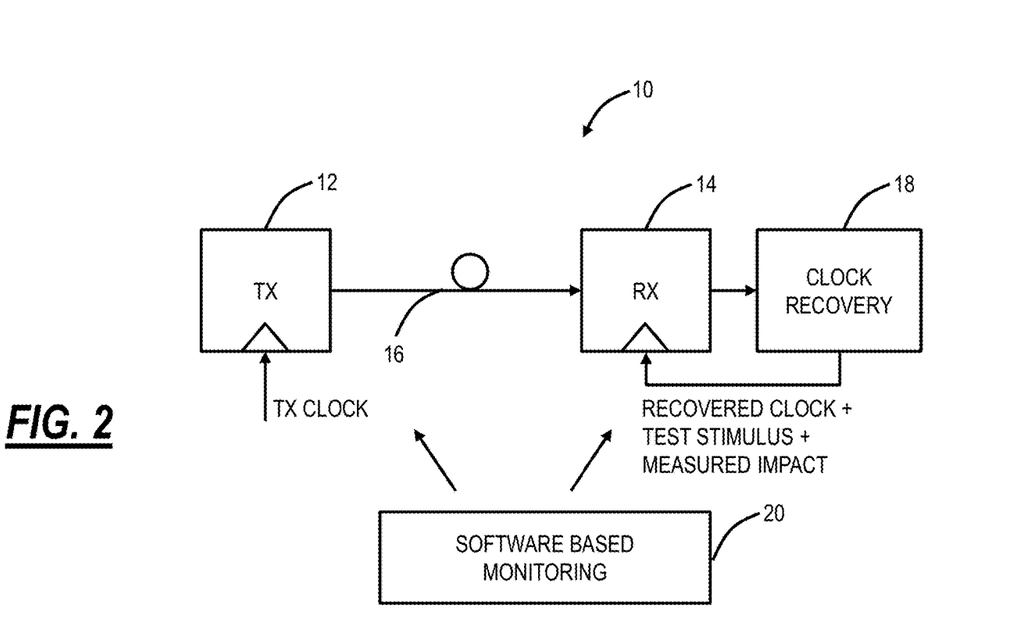
FIG. 2 is a block diagram of a system for characterizing jitter by modulating a recovered clock with a test stimulus and determining the measured impact.

FIG. 1 is a block diagram of a system 10 for characterizing jitter by modulating a transmitter clock with a test stimulus and determining the measured impact. FIG. 2 is a block diagram of the system 10 for characterizing jitter by modulating a recovered clock with a test stimulus and determining the measured impact. The system 10 includes a transmitter (Tx) 12 connected to a receiver (Rx) 14 over a fiber link 16. The receiver 14 connects to a clock recovery circuit 18. The transmitter 12 is connected to a transmitter clock and the clock recovery circuit 18 provides a recovered clock to the receiver 14 following the fiber link 14. The system 10 can also include software-based monitoring 20 that can operate the built-in circuit and control the characterization. In FIG. 1, the system 10 can be used to characterize the jitter over the fiber link 16 by modulating the transmitter clock with a test stimulus and measuring the impact at the receiver 14. In FIG. 2, the system 10 can be used to characterize the jitter supported by the receiver 14 by adding a test stimulus in the recovered clock and measuring the impact at the receiver 14. The test stimulus can be a deterministic periodic signal including any of i) a multi-tone signal having any spectral shape and distribution and ii) a deterministic band-limited noise signal.

The system 10 includes circuitry (see FIG. 3) incorporated in the transmitter 12 and/or the receiver 14 that is low cost, low power, and low footprint enabling a built-in approach that can generate jitter with fine resolution. The jitter generation is deterministic since it can be programmed in a Look-Up Table (LUT). However, the jitter generation can have any distribution (Gaussian, sinusoidal . . . ) and any power spectral density. The circuitry provides control of jitter amplitude in seconds or unit intervals, waveform type (sine, square, or noise), and frequency.

Figure 3:
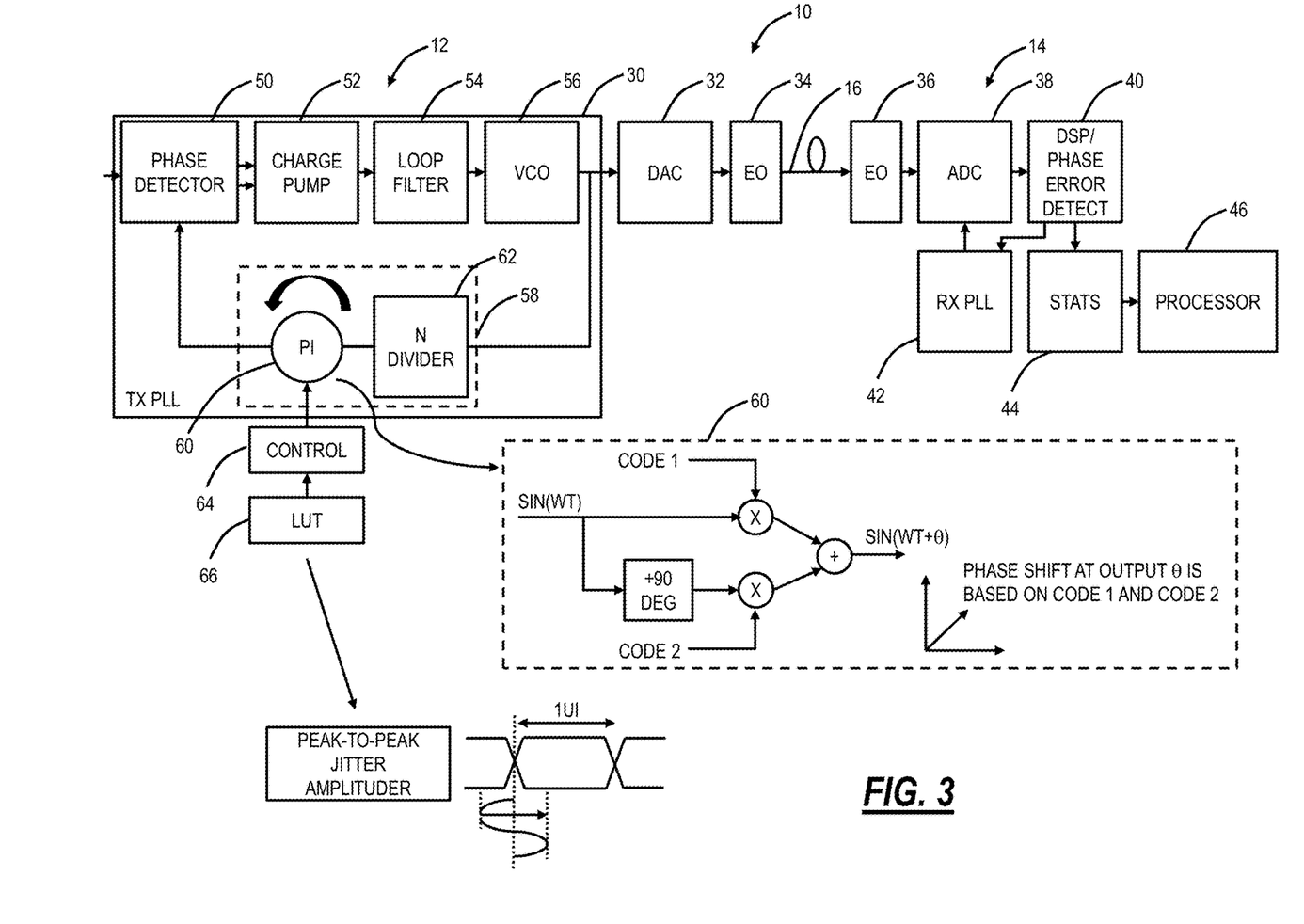
FIG. 3 is a block diagram of circuitry associated with the transmitter and the receiver for implementing jitter generation for jitter characterization.

FIG. 3 is a block diagram of circuitry associated with the transmitter 12 and the receiver 14 for implementing jitter generation for jitter characterization. The transmitter 12 includes a transmitter PLL 30 implementing digital functions and connected to a DAC 32 that provides an analog signal to an electro-optic device 34. The electro-optic device 34 provides an optical signal, e.g., coherently modulated, over the fiber link 16. The receiver 14 includes electro-optic device 36 that receives the optical signal from the fiber link 16 and provides a corresponding analog signal to an ADC 38 that connects to a DSP 40 configured, in part, to perform phase error detection. The receiver 14 also includes a receiver PLL 42. The DSP 40 can provide data related to the phase error detection to the receiver PLL 42 and statistics circuitry 44 that connects to a processor 46.

The transmitter PLL 30 includes a phase detector 50, a charge pump 52, a loop filter 54, a VCO 56, and a feedback loop 58 between an output of the VCO 56 and the phase detector 50. The feedback loop 58 includes a Phase Interpolator (PI) 60 with an N divider circuit 62 on the input. The PI 60 is connected to a control circuit 64 that is connected to a LUT 66. The PI 60 allows a circuit to adjust the phase of its sampling clocks in very fine increments. The combination of the PI 60 and the N divider circuit 62 can be referred to as a phase interpolator.

The system 10 can be used to characterize the transmitter 12, the receiver 14, and/or the fiber link 16, i.e., jitter testing for both modems and fiber channels. The system 10 includes proper control of the phase interpolators at either the transmitter or the receiver clock recovery circuitry, i.e., the transmitter PLL 30 or the receiver PLL 42, for jitter generator and control of jitter amplitude in seconds or unit intervals, waveform type (sine, square, or noise), and frequency. Specifically, the transmitter PLL 30 or the receiver PLL 42 enable jitter injection at a specified amount, type, frequency, etc. and the corresponding receiver 14 can determine if the signal is recovered.

This approach provides a low cost/built-in jitter-loading mechanism. Controlling the phase interpolator (the PI 60), with its small instantaneous phase deviation, makes it possible to inject jitter at high resolution. Since the PI 60 is part of the feedback loop 58 at the transmitter PLL 30, any movement in phase is translated into a movement in the VCO56 clock (within PLL bandwidth) feeding the DAC 32.

That is, any movement in the phase through the phase interpolator is translated by an equivalent movement in the phase of the VCO 56. And since the loop is filtered, then the deviation injected is cleaner.

A state machine, in the control 62, based on register settings allows the different reading rate of the content of the LUT 66. Such an approach permits the modulation of the transmitter 12 clock with a large range of carrier frequency at different amplitude.

The system 10 can program one tone or multi-tone on both the transmitter 12 and/or the receiver 14. Accordingly, a jitter signature can be used to characterize the fiber link 16 or a transceiver. In an embodiment, an automated tool in the system 10 utilizing the control 64 is able to produce a jitter mask based on fixed jitter at the transmitter 12, to ensure compliance thereto. In another embodiment, the automated tool in the system 10 utilizing the control 64 is able to produce a jitter mask based on changing jitter at the transmitter 12 or the receiver 14 until a certain metric threshold is crossed at the receiver 14, to determine maximum jitter.

In FIGS. 1-3, the system 10 has three key elements, namely i) the transmitter PLL 30 with the PI 60, integrated in the feedback loop 58 used to inject a modulated eye, ii) re-usage of existing clock recovery circuit (also called a clock-data recovery circuitry (CDR)) in the receiver 14 for jitter reporting, and iii) the software-based monitoring 20 automated to perform the measurements.

The PI 60 is acting as an infinite delay line used to shift clock phase within a data sampling window. The input to the PI 60 includes two clocks, having the same frequency, but with a 90° phase difference. Each clock is multiplied by a code, codes 1, 2 that are used to determine the phase shift at the output. The codes 1, 2 can be based on the LUT 66. The weight, X is set by digitally controlled by a DAC. Then the granularity is determined by the resolution of the DAC (number of controlled bits) and the frequency of the cross-coupled VCO 56. The phase modulator output is non-linear due to the trigonometric element:

$$\Phi = tan^{-1}\left(\frac{X}{1-X}\right) \quad (2)$$

The idea in the jitter injecting process is that, at the transmitter 12, there is a deliberate widening of the transition areas in the eye diagram. With the original clock having the following model:

$$sig = \alpha * \cos(w_c * t) \quad (3)$$

where $\alpha$ is the amplitude of the signal and $w_c = 2*\pi*F_c$ (carrier frequency). The noisy signal, or phase modulated version, is the original signal with added phase noise. It takes the form of:

$$sig_{noisy} = \alpha * \cos(w_c * t + \beta * \cos(w_m * t)) \quad (4)$$

where $\beta$ is the amplitude of the jitter and $w_m = 2*\pi*F_m$ (modulation frequency). The equivalent jitter is seconds, peak-to-peak is defined as:

$$Jitter_{pp,seconds} = \frac{2*\beta}{2*\pi*F_c} \quad (5)$$

The system 10 re-uses circuits available in a typical receiver 14 for clock recovery for BER and jitter estimations. For the former approach, such as a Gardner based detector can be used (see Gardner, F. M., "A bpsk/qpsk timing-error detector for sampled receivers," IEEE Trans. Commun. 1986, 34, 423-429), where the timing error detected for the kth symbol is given by:

$$e(k) = a_1(k) + a_Q(k) \quad (6)$$

Where:

$$a_1(k) = \{y_1((k-1)T+d_{k-1}) - y_1(kT-d_k)\} y_1(kT-T/2+d_{k-1})$$

$$a_Q(k) = \{y_Q((k-1)T+d_{k-1}) - y_Q(kT-d_k)\} y_Q(kT-T/2+d_{k-1})$$

And T is the period of symbol, $d_k$ is the estimate of the phase at kT and $y_1$ and $y_Q$ are the received in-phase and quadrature components. Jitter rms is estimated as:

$$Jitter_{rms} = \frac{1}{T} \frac{\{E[e(\tau_0)^2]\}^{1/2}}{slope(\tau_0)} \quad (7)$$

where $\tau_0$ corresponds to the positive zero crossing point and the expectation is normalized to the unit interval.

Controlling the PI 60, with its small instantaneous phase deviation, makes it possible to inject jitter at high resolution. With the PI 60 being part of the transmitter PLL 30 feedback loop 58 at the transmitter 12, any movement in phase is translated into a movement in the VCO clock feeding the DAC.

The state machine, in the control 64 block, based on register settings allows the different reading rate of the content of the LUT 66. Such methodology permits the modulation of the transmitter clock with a large range of carrier frequency at different amplitude. Comparing to J. Liang, et al., "Jitter injection for on-chip jitter measurement in PI-based CDRs," 2017 *IEEE Custom Integrated Circuits Conference (CICC)*, Austin, Tex., 2017, pp. 1-4, the system 10 is able to generate any form of phase signal and not just square wave. As well, the fact that the PI 60 is in the feedback path of the PLL 30, the injection is clean.

Figure 4:
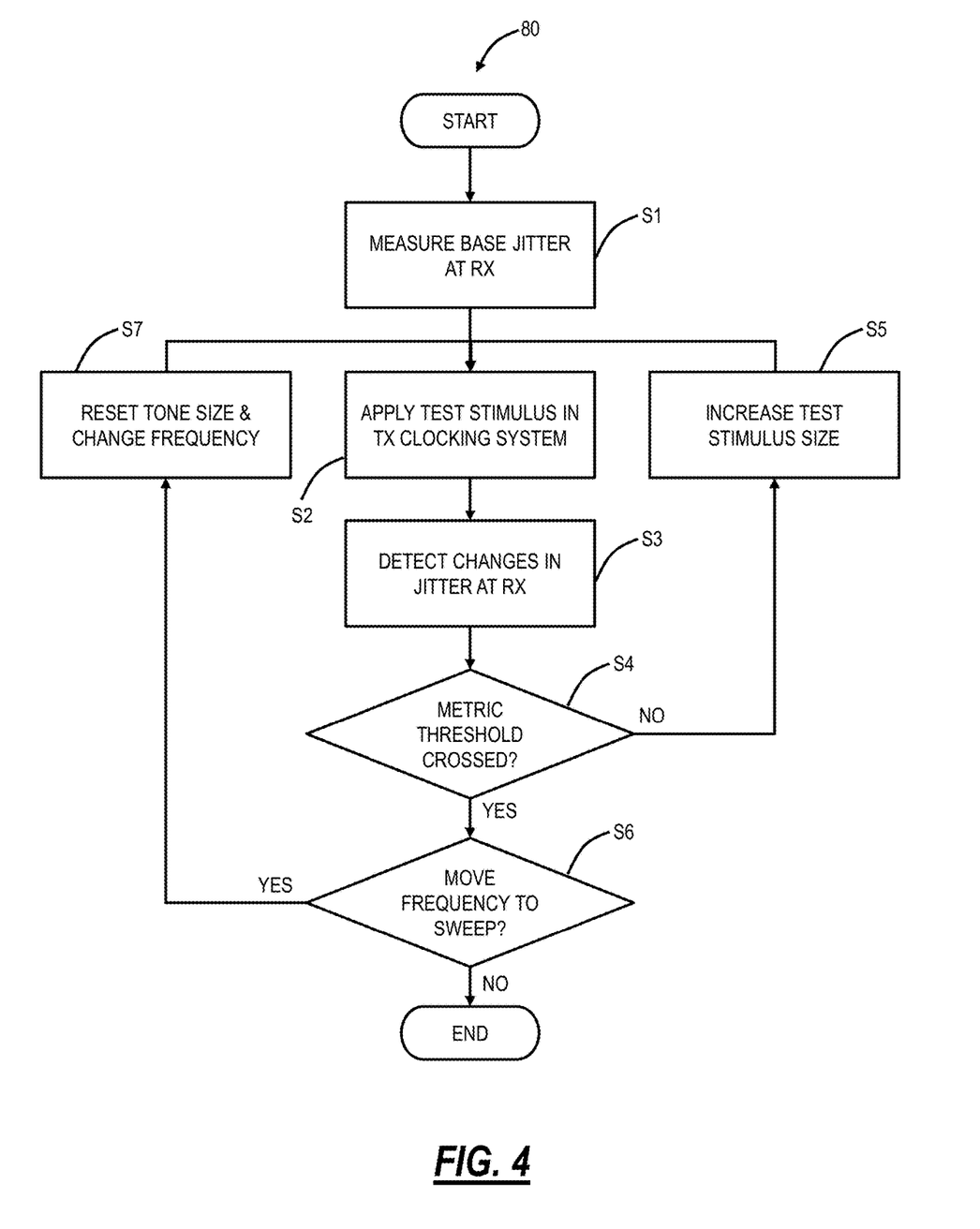
FIG. 4 is a flowchart of an automated process for jitter characterization.

FIG. 4 is a flowchart of an automated process 80 for jitter characterization. The process 80 contemplates operation in the system 10 for determining support for jitter. In the automated process 80 jitter amplitude is increased until the threshold associated with a metric is crossed to characterize jitter support. In another embodiment, the jitter can be set to a specific value and tested. The metrics may include a target BER, a Forward-Error-Correction (FEC) hit, and a measured threshold on jitter Root Mean Square (RMS).

The automated process 80 includes measuring base jitter at the receiver (step S1), applying a test stimulus in the transmitter clocking system (step S2), and detecting changes in the jitter at the receiver (step S3). The changes can be from the base jitter. If a metric threshold is crossed (step S4), the automated process 80 can include increasing the test stimulus size (step S5) and returning to step S2. If the metric threshold is not crossed (step S4), the automated process 80 can include moving the frequency to sweep (step S6) and resetting the test stimulus size and frequency (step S7). If all frequencies have been swept (step S6), the automated process 80 ends.

Jitter Characterization Application

One of the applications is transmitting a clean test stimulus over the fiber link 16 and using the receiver PLL 42 as a phase modulation detector in order to perform a jitter tolerance measurement or jitter characterization. For the jitter tolerance measurement, the application can include how much sinusoidal jitter the CDR can tolerate, based on predefined metrics, i.e., BER, FEC, jitter amounts, etc. For the jitter characterization, the application can characterize the transmitter PLL 30 and the receiver PLL 42.

The built-in circuitry and process can be used with digital noise loading such as described in commonly-assigned U.S. Pat. No. 9,225,430, issued Dec. 29, 2015, and entitled "Digital noise loading for optical receivers, and with commonly-assigned U.S. Pat. No. 9,960,843, issued May 1, 2018, and entitled "Nonlinear spatially resolved interferometer (NL-SRI) for characterizing optical properties of deployed telecommunication cables," the contents of each are incorporated by reference herein.

The built-in circuitry and process can also be used internally in the lab, manufacturing, New Product Introduction (NPI), etc. to characterize and calibrate products. Furthermore, the built-in circuitry and process could be provided as an application for customers.

The built-in circuitry and process can be used in the following characterization scenarios:

Receiver with a golden transmitter, and back-to-back fiber, such as for interoperability and NPI;

Transmitter with a golden receiver, and back-to-back fiber, such as for interoperability and NPI;

Jitter Characterization Results

As discussed, one of the major electrical parameters used to characterize systems performance is, at a given BER, the receiver's ability to track jitter. It can be characterized either as an RMS value in the time domain, or spectral density over the bandwidth (dB/Hz) in the frequency domain.

Figure 5:
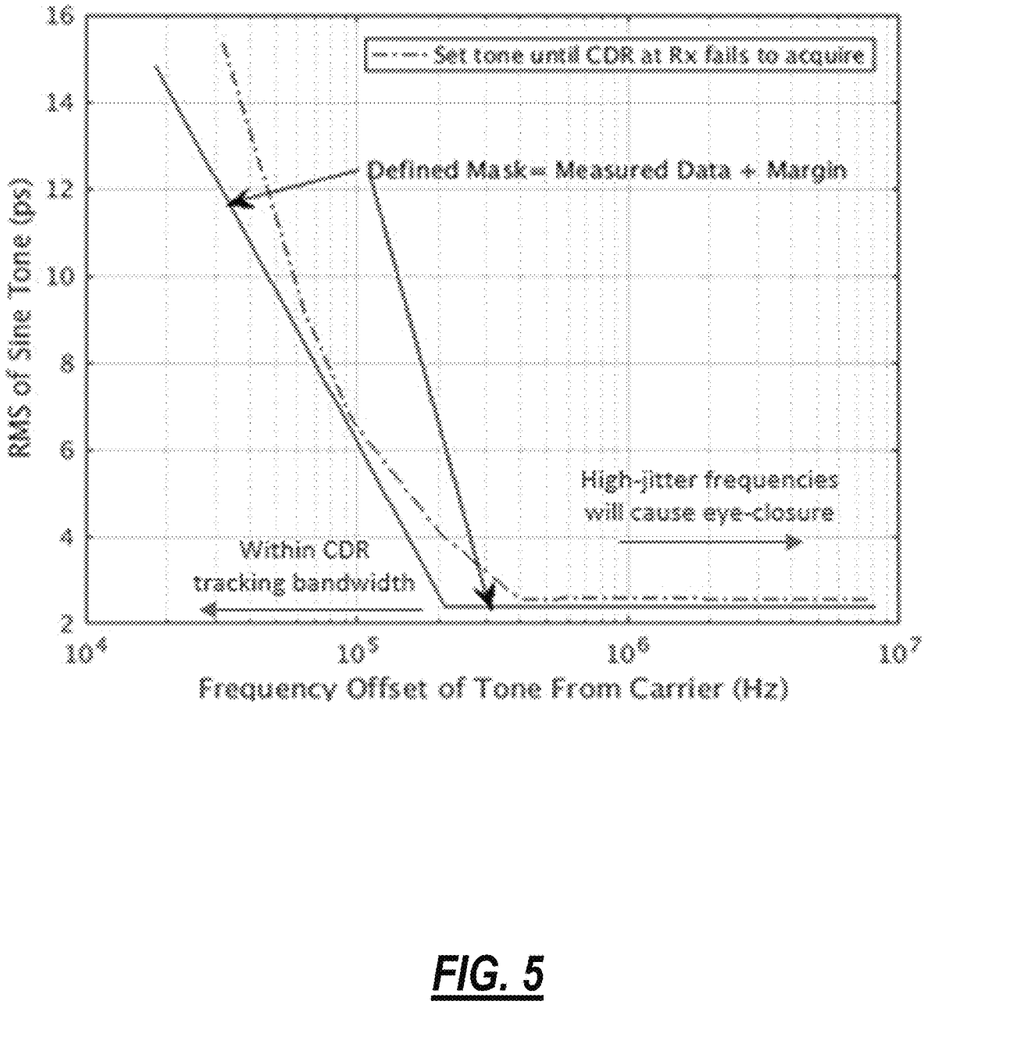
FIG. 5 is a graph of a jitter tolerance mask for given Clock and Data Recovery (CDR) settings.

As proof of concept, a back-to-back configuration was implemented, i.e., a transmitter optical output signal goes directly to the receiver using a patch optical fiber, while the transmitter is golden, i.e., has low intrinsic jitter. FIG. 5 is a graph of a jitter tolerance mask for given CDR settings. In FIG. 5, when loading the LUT with various sinusoidal waveforms at different frequencies, the CDR tolerance of the receiver to track the injected spur are shown. The x-axis is defined as the frequency of the spur and the y-axis, in pico-second (ps) or could be unit-interval (UI). Jitter tolerance is defined as a mask, which is specified as industry consensus among various vendors. The receiver shall meet the tolerance mask. The latter can be programmed as part of the software to ease debugging through a simple pass/fail flag.

Since the injected test stimulus is independent of the existing jitter sources, the accumulated jitter rms is derived as follow:

$$\text{Jitter}_{Total} = \left(\text{Total intrinsic jitter}^2 + \left(\frac{10^{L_{spur}/20}}{\pi f_0}\right)^2\right)^{1/2} \quad (8)$$

with $f_0$ being the frequency of the spur. Usually, a mask does not apply to spurs, therefore broadband phase noise only. However, another specification related to total jitter RMS (in ps) is specified to combine the two.

SOP

Various advanced techniques are used including advanced coherent modulation techniques, polarization multiplexing, flexible grid spacing, and the like in optical line systems. With these advanced techniques, optical line systems suffer new degrees of susceptibility to transients on a time-varying optical channel, including polarization transients, etc. As described herein, a State of Polarization (SOP) transient source causes an SOP transient which is anything that causes quick changes in the SOP of signals on the fiber link 16.

Coherent optical line systems are configured to track SOP changes as part of normal operation, but when quick SOP transients occur, these can be outside the tracking ability, leading to errors, loss of framing, etc. Example SOP transient sources can include, without limitation, external vibrations (e.g., bridges, roads, railroads, wind, etc.), bad splices on the optical fiber, weather (e.g., lightning, wind, etc.), or the like. Usually, SOP transient sources behave unpredictably and from unknown locations in the fiber. Further, SOP transient sources can be time specific, seasonal, etc. Thus, it is important in optical line systems to have some technique for real-time, in-service measurement. SOP transients can be particularly problematic with coherent transmission, and especially difficult to localize/isolate given their nature in general. An application using a polarimeter with an optical line system for SOP transient localization is described in commonly-assigned U.S. patent application Ser. No. 14/865,802 filed Sep. 25, 2015, and entitled "SYSTEMS AND METHODS USING A POLARIMETER TO LOCALIZE STATE OF POLARIZATION TRANSIENTS ON OPTICAL FIBERS," the contents of which are incorporated by reference.

With the increased deployment of aerial fibers packaged as OPtical Ground Wire (OPWG), which offer cost reduction compared to buried ones, exposes the data transmitted through the bundled fibers to fast SOP transients. Since OPWG external structure is built to discharge the lightning, the Faraday effect on the two polarizations is observed (see Edward Collett, "Polarized Light: Fundamentals and Applications," (Optical Engineering, Vol 36), 1st Edition. ISBN-10: 0824787293). An in-depth study performed, in Thomas Brugiere et al., "Polarization Activity Monitoring of an Aerial Fiber Link in a Live Network", OFC, Anaheim, Calif., pp. 1-3, 2016, showed a maximum SOP of 115,200 krad/s; while in buried fibers, in L. E. Nelson, M. Birk, S. L. Woodward, and P. Magill, "Field Measurements of Polarization Transients on a Long-Haul Terrestrial Link," in IEEE Photonic Society 24th Annual Meeting (IEEE, 2011), pp. 833-834, the maximum SOP rate monitored is in the order of tens of krad/s. Other causes of SOP can be mechanical vibration of the fiber cable due to trains or construction work.

Moving from private networks (closed cables and transponders) to both interoperable transponders (white box, 400GZR) and open cables (submarine) are current trends in optical networking. Therefore, the need for more physical level tests to characterize modems/channels, consisting of both measuring BER/Noise tolerance and eye-diagram/jitter tolerance, is becoming vital for network operators.

In addition to the built-in circuitry and process for jitter characterization, the present disclosure includes built-in circuitry and process for polarization tracking testing. Specifically, testing both modems (e.g., receiver 14 polarization tracking capability) and the fiber link 16 (i.e., the interaction between the fiber and fast SOP tolerance of receivers). As is shown herein, the penalty seen at the receiver 14 changes with different link parameters. Therefore, custom characterization can be of great benefit for network planning.

Figure 6:
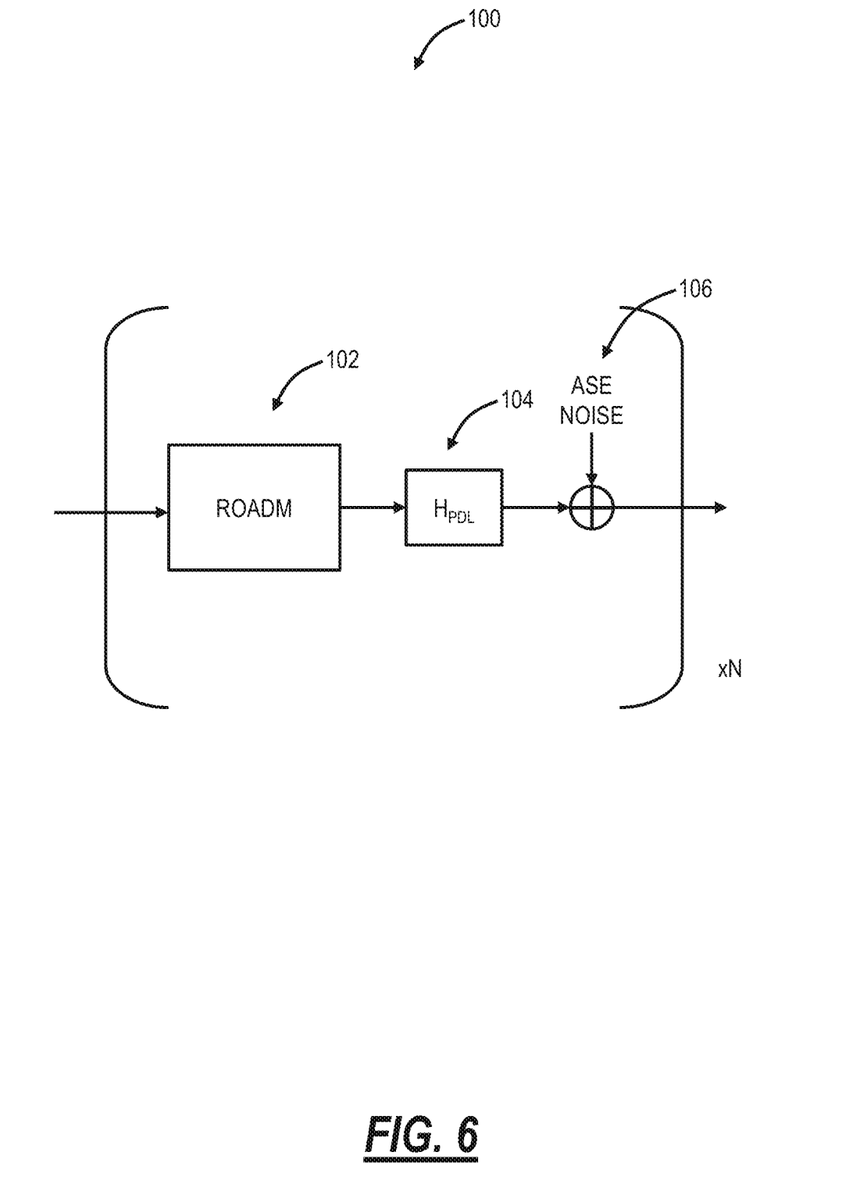
FIG. 6 is a simulated fiber model for polarization impact.

FIG. 6 is a simulated fiber model 100 for polarization impact. Here, a Reconfigurable Optical Add/Drop Multiplexer (ROADM) node 102 transmits a signal that is affected by a transfer matrix HPDL that characterizes Polarization Dependent Loss (PDL) as well as ASE noise added over the channel. The present disclosure includes the ability to adjust the SOP at a transmitter 12 for corresponding measurements at a receiver 14.

Figure 7:
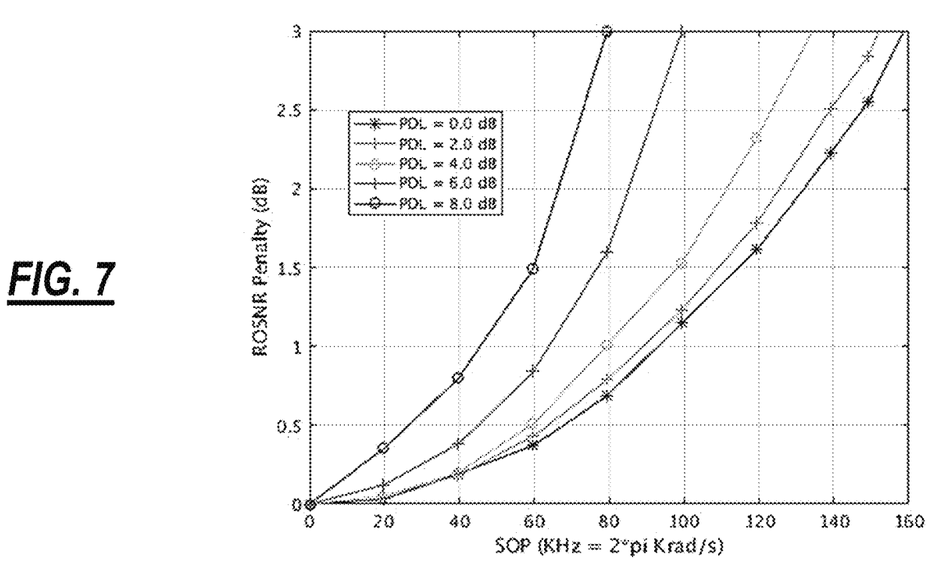
FIG. 7 is a graph illustrating Receiver Optical Signal to Noise Ratio (ROSNR) versus the State of Polarization (SOP) for differing values of Polarization Dependent Loss (PDL)
Figure 8:
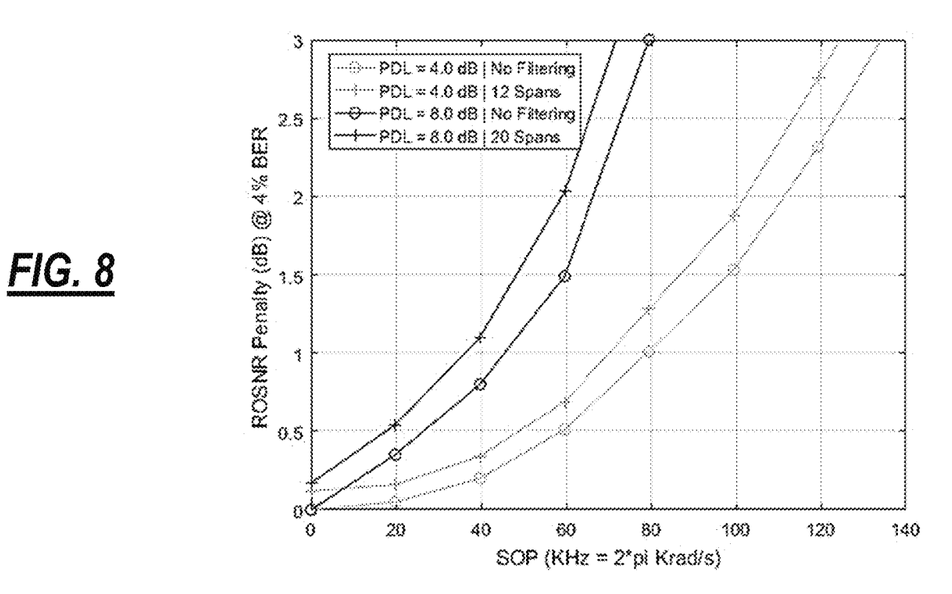
FIG. 8 is a graph illustrating ROSNR versus SOP for differing values of PDL, number of spans, and no filtering.

FIG. 7 is a graph illustrating Receiver Optical Signal to Noise Ratio (ROSNR) versus State of Polarization (SOP) for differing values of Polarization Dependent Loss (PDL). FIG. 8 is a graph illustrating ROSNR versus SOP for differing values of PDL, number of spans, and no filtering.

The built-in circuitry and process for polarization tracking testing apply SOP rotation by multiplying the upcoming data on the X/Y polarization by the following matrix:

$$T = \begin{bmatrix} T_{xx} & T_{yx} \\ T_{xy} & T_{yy} \end{bmatrix} \quad (9)$$

with $T_{xx}$, $T_{xy}$, $T_{yx}$, and $T_{yy}$ being one complex tap.

Figure 9:
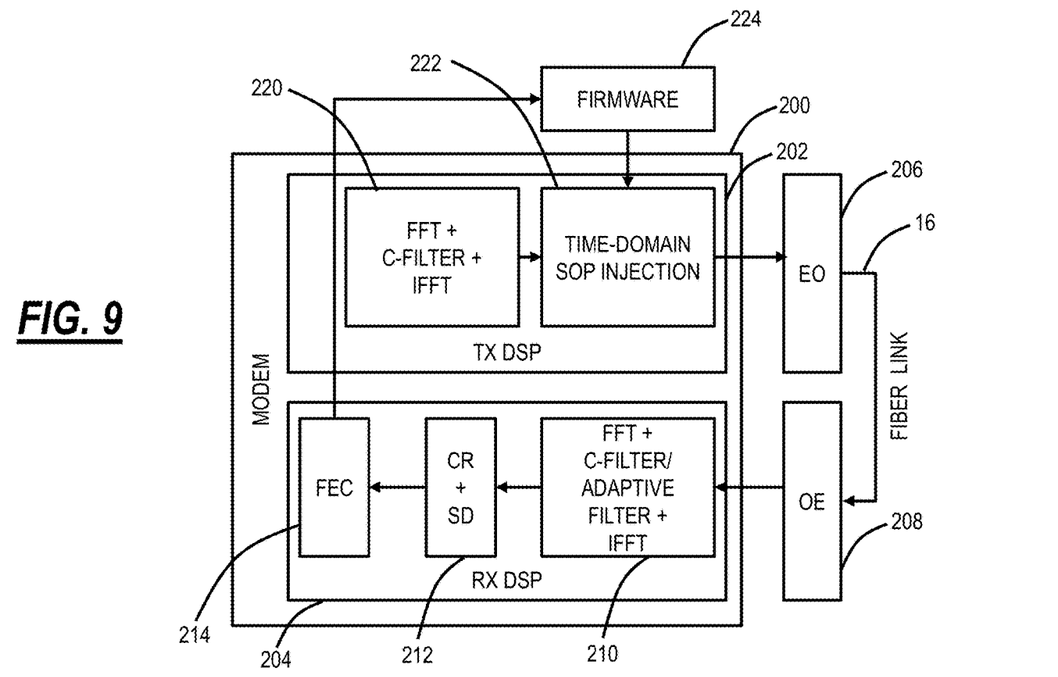
FIG. 9 is a block diagram of an optical modem configured for SOP characterization utilizing SOP injection in the datapath.
Figure 10:
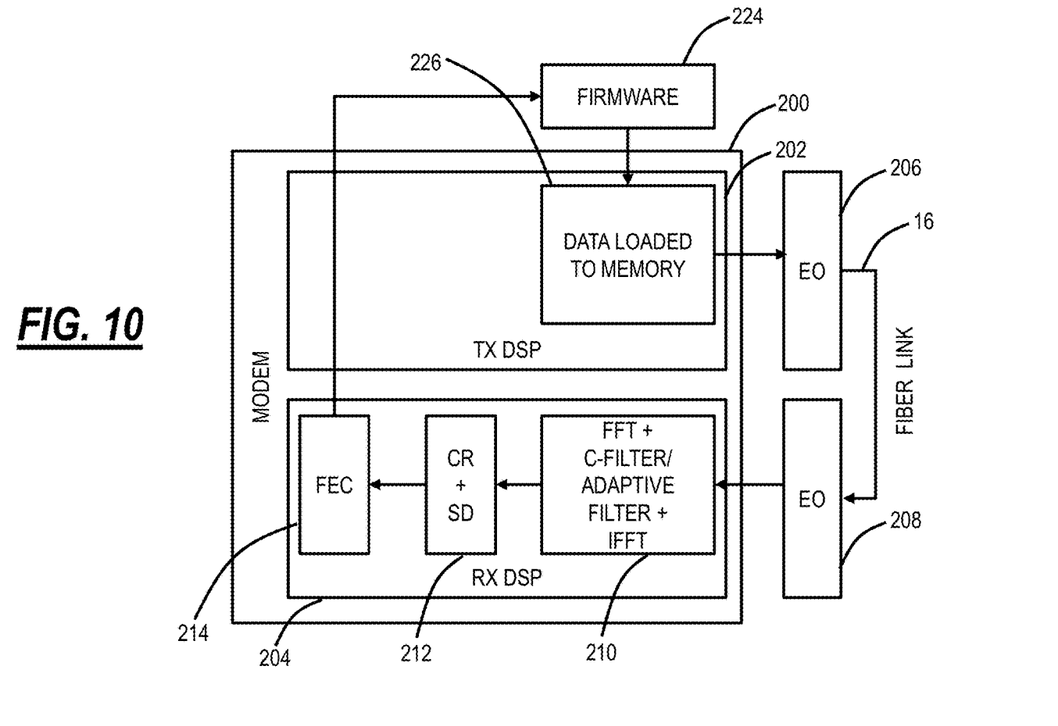
FIG. 10 is a block diagram of the optical modem configured for SOP characterization utilizing data loaded into memory.

FIG. 9 is a block diagram of an optical modem 200 configured for SOP characterization utilizing SOP injection in the datapath. FIG. 10 is a block diagram of the optical modem 200 configured for SOP characterization utilizing data loaded into memory. Specifically, FIGS. 9 and 10 provide two possible realizations, FIG. 9 with the circuit in the datapath and FIG. 10 with loading data into memory (with the disadvantage that the data will be repeated and that might be a problem based on the adaptive filtering used in the receiver 14). The optical modem 200 can include the transmitter 12 and the receiver 14 described herein, including the built-in circuitry for jitter characterization.

The optical modem includes a transmitter DSP 202 and a receiver DSP 204. The transmitter DSP 2020 connects to an Electro-optic (EO) device 206 that optically communicates over the fiber link 16 to an EO device 208 that connects to the receiver DSP 204. The receiver DSP 204 includes a filtering block 210 with Fast Fourier Transform (FFT), Inverse FFT (IFFT), adaptive filters, etc. The filtering block 210 connects to a Carrier Recovery (CR) and Signal Decode (SD) block 212 that connects to a FEC block 214. The receiver DSP 204 is configured to recover a signal transmitted by the EO device 206 over the fiber link 16.

The transmitter DSP 202 is configured to enable SOP testing. In FIG. 9, the transmitter DSP 202 includes a filtering block 220 that connects to a time-domain SOP injection block 222. This approach injects SOP changes in the datapath. The time-domain SOP injection block 222 can be controlled based on firmware 224 that receives feedback from the FEC block 214. Based on data set by the user and the testing mode, the firmware 224 will generate a general Jones matrix below in Eq. (10) and copy data into an array inside the circuitry. Another control block will read the array in sequence and apply the new values to the tap registers (T above) when change required:

$$H_{rotation\,only} = \begin{bmatrix} \cos(\theta)\cdot\exp(i\Phi) & \sin(\theta)\cdot\exp(i\Phi) \\ -\sin(\theta)\cdot\exp(-i\Phi) & \cos(\theta)\cdot\exp(-i\Phi) \end{bmatrix} \quad (10)$$

In FIG. 10, the transmitter DSP 202 includes a memory block 226 with preloaded data for SOP changes.

With the availability of transmitter and receiver static filters, the possibility to add more impairment is also possible. At least the following configurations are possible
Differential Group Delay (DGD)/SOP/DGD
DGD/SOP
SOP/DGD It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A system comprising:
an optical transmitter including a transmitter Phase Lock Loop (PLL) circuit;
an optical receiver connected to the optical transmitter and including a receiver PLL circuit; and
circuitry configured to inject a test stimulus to a clock purposefully causing jitter in one of the transmitter PLL circuitry and the receiver PLL circuit,
wherein the test stimulus is set for characterizing the jitter support of the system and is set to produce a jitter mask based on a fixed jitter value, and wherein the optical receiver is configured to determine compliance to one or more thresholds to determine if the system is operational at the fixed jitter value.

2. The system of claim 1, wherein the optical receiver is configured to determine if the system is operational at the fixed jitter value due to the test stimulus based on compliance to one or more thresholds including any of a target Bit Error Rate, a Forward-Error-Correction (FEC) hit, and a jitter Root Mean Square (RMS).

3. The system of claim 1, wherein the test stimulus is ft set to produce different jitter values in amplitude and frequency, and wherein the optical receiver is configured to determine if the system is operational at the different jitter values based on compliance to the one or more thresholds.

4. The system of claim 1, further comprising:
a fiber link between the optical transmitter and the optical receiver, wherein the test stimulus is utilized to characterize the jitter support of the fiber link.

5. The system of claim 1, wherein the circuitry configured to inject the test stimulus is integrated in the optical transmitter, and wherein the optical receiver is configured to recovery a clock and measure an impact of the caused jitter.

6. The system of claim 1, wherein the circuitry configured to inject the test stimulus is integrated in the optical transmitter and wherein the optical receiver is configured to recovery a clock plus the test stimulus and measure an impact of the caused jitter.

7. The system of claim 1, wherein the circuitry configured to inject the test stimulus is programmed utilizing a Look Up Table (LUT).

8. The system of claim 1, wherein the circuitry configured to inject the test stimulus is integrated in the transmitter PLL as a phase interpolator in a feedback loop.

9. The system of claim 1, further comprising:
firmware configured to perform a State of Polarization (SOP) injection at the optical transmitter, to characterize optical receiver tolerance to SOP transient operation.

10. The system of claim 1, further comprising:
firmware configured to perform both State of Polarization (SOP) and Differential Group Delay (DGD) injection at the optical transmitter, to characterize optical receiver tolerance to SOP transient operation, in presence of DGD.

11. The system of claim 1, wherein the test stimulus is a deterministic periodic signal including any of i) a multi-tone signal having any spectral shape and distribution and ii) a deterministic band-limited noise signal.

12. An optical receiver comprising:
an Electro-Optic (EO) device configured to interface a fiber link;
an Analog-Digital Converter (ADC) connected to the EO device;
a receiver Digital Signal Processor (DSP) connected to the ADC; and
a receiver Phase Lock Loop (PLL) circuit connected to the ADC and the receiver DSP;
wherein the receiver DSP and the receiver PLL are configured to recover a clock from an optical signal received over the fiber link and to measure an impact of jitter purposefully injected in the clock, and
wherein the jitter mask purposefully injected is set to produce a jitter mask based on a fixed jitter value, and wherein the optical receiver is configured to determine compliance to one or more thresholds to determine if the optical receiver is operational at the fixed jitter value.

13. The optical receiver of claim 12, wherein the jitter purposefully injected is further at a specified jitter value, and wherein the receiver DSP is configured to determine compliance to the one or more thresholds including any of a target Bit Error Rate, a Forward-Error-Correction (FEC) hit, and a jitter Root Mean Square (RMS).

14. The optical receiver of claim 12, wherein the jitter purposefully injected is further set to produce different jitter values in amplitude and frequency, and wherein the optical receiver is configured to determine if the optical receiver is operational at the different jitter values based on compliance the one or more thresholds.

15. An optical transmitter comprising:
a transmitter Phase Lock Loop (PLL) circuit configured to receive a signal with an associated clock;
a Digital-to-Analog Converter (DAC) connected to the transmitter PLL; and
an Electro-Optic (EO) device connected to the DAC and configured to transmit over a fiber link,
wherein the transmitter PLL circuit is configured to inject a test stimulus to the associated clock purposefully causing jitter for characterizing jitter support, test and wherein the test stimulus is set to produce a jitter mask based on a fixed jitter value, and wherein a corresponding optical receiver is configured to determine compliance to one or more thresholds to determine if the optical receiver is operational at the fixed jitter value.

16. The optical transmitter of claim 15, wherein corresponding optical receiver is configured to determine compliance to the one or more thresholds including any of a target Bit Error Rate, a Forward-Error-Correction (FEC) hit, and a jitter Root Mean Square (RMS).

17. The optical transmitter of claim 15, wherein the transmitter PLL circuit includes a phase interpolator in a feedback loop.

18. The optical transmitter of claim 15, further comprising:
firmware configured to perform a State of Polarization (SOP) injection to the signal, to characterize SOP transient operation.

* * * * *